US012677758B2

(12) United States Patent
Zur et al.

(10) Patent No.: US 12,677,758 B2
(45) Date of Patent: Jul. 14, 2026

(54) PLANT ROOT MANAGEMENT AND PROTECTION

(71) Applicant: TREE-TUBE LTD., Kfar Azar (IL)

(72) Inventors: Shachar Zur, Tel Aviv (IL); Ron Cohen, Kfar Azar (IL); Jacov Eilon, Kfar Sava (IL); Yehonatan Antebi, Herzeliya (IL); Shlomo Shalev, Rehovot (IL)

(73) Assignee: TREE-TUBE LTD., Kfar Azar (IL)

( * ) Notice: Subject to any disclaimer, the term of this patent is extended or adjusted under 35 U.S.C. 154(b) by 6 days.

(21) Appl. No.: 18/012,931

(22) PCT Filed: Jun. 24, 2021

(86) PCT No.: PCT/IL2021/050776
§ 371 (c)(1),
(2) Date: Dec. 25, 2022

(87) PCT Pub. No.: WO2021/260703
PCT Pub. Date: Dec. 30, 2021

(65) Prior Publication Data
US 2023/0263105 A1 Aug. 24, 2023

Related U.S. Application Data

(60) Provisional application No. 63/043,890, filed on Jun. 25, 2020.

(51) Int. Cl.
*A01G 9/029* (2018.01)

(52) U.S. Cl.
CPC .................................. *A01G 9/0291* (2018.02)

(58) Field of Classification Search
CPC . A01G 9/0291; A01G 13/0237; A01G 23/046
See application file for complete search history.

(56) References Cited

U.S. PATENT DOCUMENTS 4,188,154 A * 2/1980 Izatt ...................... E02B 11/005
405/38
4,348,831 A * 9/1982 Chambers ................ A01G 9/12
47/24.1

(Continued)

FOREIGN PATENT DOCUMENTS

WO 2019043720 A1 3/2019

OTHER PUBLICATIONS

PCT International Search Report for International Application No. PCT/IL2021/050776, mailed Oct. 18, 2021, 3pp.

(Continued)

*Primary Examiner* — Joshua D Huson
*Assistant Examiner* — Edgar Reyes
(74) *Attorney, Agent, or Firm* — The Roy Gross Law Firm, LLC; Roy D. Gross

(57) ABSTRACT

A plant root management and protection system configured for embedding within a dug pit, the system comprising: a sidewall peripherally defining a receiving internal cavity and having (i) a top opening dimensioned to receive a root ball of a plant therethrough, and (ii) a bottom opening defined by a peripheral edge of the sidewall; and at least one root-guiding extension extending outwardly from the sidewall and perpendicularly to a longitudinal axis of the sidewall, wherein each of the at least one root-guiding extensions defines an open-ended hollow passageway in communication with the cavity; wherein, when embedded a dug pit, the longitudinal axis of the sidewall is upright and the top opening does not extend above surface level, and wherein at least a vertical portion of the sidewall ending with the peripheral edge is configured for entrenching in a bottom surface of the pit.

20 Claims, 6 Drawing Sheets

(56) References Cited

U.S. PATENT DOCUMENTS

| | | | |
|---|---|---|---|
| 9,686,921 B2 * | 6/2017 | Baron .................. | A01G 17/005 |
| 2012/0227316 A1 | 9/2012 | Ptak | |
| 2013/0174482 A1 * | 7/2013 | Galdi ..................... | A01G 9/021 |
| | | | 47/65.5 |
| 2016/0270305 A1 * | 9/2016 | Shaffer ................ | A01G 13/105 |
| 2016/0374275 A1 * | 12/2016 | Galdi ................... | A01G 9/0291 |
| | | | 47/66.1 |
| 2017/0000044 A1 * | 1/2017 | Palmer ............... | A01G 13/0243 |
| 2018/0014482 A1 * | 1/2018 | Al-Anzi ................... | A01G 9/00 |
| 2020/0080269 A1 * | 3/2020 | Schletzbaum ........ | E02B 11/005 |
| 2020/0170202 A1 * | 6/2020 | Rodriguez ............ | A01G 23/04 |
| 2022/0264811 A1 * | 8/2022 | Mote, Jr. ................ | A01G 25/06 |

OTHER PUBLICATIONS

PCT Written Opinion for International Application No. PCT/IL2021/050776, mailed Oct. 18, 2021, 5pp.

PCT International Preliminary Report on Patentability for International Application No. PCT/IL2021/050776, issued Dec. 13, 2022, 6pp.

Abigail Klein Leichman: preeTube lets roots grow without breaking the sidewalk,Israel21c,May 15, 2019 (May 15, 2019), XP093163355,Retrieved from the Internet: URL: [https://www.israel21c.org/treetube-lets-roots-grow-without-breaking-the-sidewalk].

* cited by examiner

PLANT ROOT MANAGEMENT AND PROTECTION

CROSS-REFERENCE TO RELATED APPLICATION

This application is a National Phase of PCT Patent Application No. PCT/IL2021/050776 having International filing date of Jun. 24, 2021, which claims the benefit of priority of U.S. Provisional Application Ser. No. 63/043,890, filed Jun. 25, 2020, the content of which are all incorporated herein by reference in its entirety.

FIELD OF THE INVENTION

Embodiment of the present invention relate to the field of management of tree growth.

BACKGROUND

Trees offer significant economic, social, and environmental benefits to the urban environment. Among other benefits, trees beautify the streetscape, offer shade foliage for pedestrians, intercept and absorb air pollution, help combat the effects of urban heat islands, and provide wildlife habitat.

However, successfully growing trees in a dense urban environment presents several challenges. Hardscape surfaces, such as concrete sidewalks, parking lots, and driveways are generally supported on compacted soil or fill. For trees to develop into mature plants, they must be provided with sufficient high-quality soil, adequate moisture, and efficient soil drainage. Lack of adequate soil volume, and poor irrigation and ventilation in the subsoil, are among the main causes of street tree decline.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, a plant root management and protection system configured for embedding within a dug pit, the system comprising: a sidewall peripherally defining a receiving internal cavity and having (i) a top opening dimensioned to receive a root ball of a plant therethrough, and (ii) a bottom opening defined by a peripheral edge of the sidewall; and at least one root-guiding extension extending outwardly from the sidewall and perpendicularly to a longitudinal axis of the sidewall, wherein each of the at least one root-guiding extensions defines an open-ended hollow passageway in communication with the cavity; wherein, when embedded a dug pit, the longitudinal axis of the sidewall is upright and the top opening does not extend above surface level, and wherein at least a vertical portion of the sidewall ending with the peripheral edge is configured for entrenching in a bottom surface of the pit.

There is also provided, in an embodiment, a method for plant root management and protection within a dug pit, the method comprising providing a system comprising: a sidewall peripherally defining a receiving internal cavity and having (i) a top opening dimensioned to receive a root ball of a plant therethrough, and (ii) a bottom opening defined by a peripheral edge of the sidewall, and at least one root-guiding extension extending outwardly from the sidewall and perpendicularly to a longitudinal axis of the sidewall, wherein each of the at least one root-guiding extensions defines an open-ended hollow passageway in communication with the cavity, wherein, when embedded a dug pit, the longitudinal axis of the sidewall is upright and the top opening does not extend above surface level, and wherein at least a vertical portion of the sidewall ending with the peripheral edge is configured for entrenching in a bottom surface of the pit; embedding the system within the dug pit such that the longitudinal axis of the sidewall is upright and the top opening does not extend above the hardscape; entrenching the vertical portion in the bottom surface; at least partially filling the system with a rooting medium; and planting a tree through the top opening.

In some embodiments, when embedded within the dug pit, each of the at least one root-guiding extensions is configured for sitting on top of the bottom surface.

In some embodiments, the sidewall is configured to resist lateral loads from one or more paving systems adjoining the dug pit.

In some embodiments, the sidewall is configured to resist penetration by roots of said root ball.

In some embodiments, the peripheral edge has a profile selected from the group consisting of: a saw-tooth profile, a scalloped profile, and a zigzag profile.

In some embodiments, the sidewall has a length of between 60-200 cm, and wherein the vertical portion of the peripheral edge has a length of between 10-30% of the length of the sidewall.

In some embodiments, the sidewall has a cross-sectional profile selected from the group consisting of: a circle, an oval, an octagon, and a rectangle.

In some embodiments, the system is made of at least one of: a rigid material, a semi-rigid material, and a flexible material.

In some embodiments, the system is made of one or more materials selected from the group consisting of: a polymer, a polyolefin, cast iron, black iron, steel, clay, clay compounds and concrete.

In some embodiments, the system is made of one or more materials which are substantially impervious to water and nutrients intended for root growth.

In some embodiments, the system comprises a duct configured to provide air exchange between one or more locations within the internal cavity and the ambient atmosphere.

In some embodiments, the duct is located within side sidewall. In some embodiments, the duct is further configured to provide air exchange between one or more locations within the at least one root-guiding extension and the ambient atmosphere. In some embodiments, the duct comprises a plurality of perforations along its length.

In some embodiments, the duct comprises an irrigation element. In some embodiments, the irrigation element is a drip irrigation element.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1A:
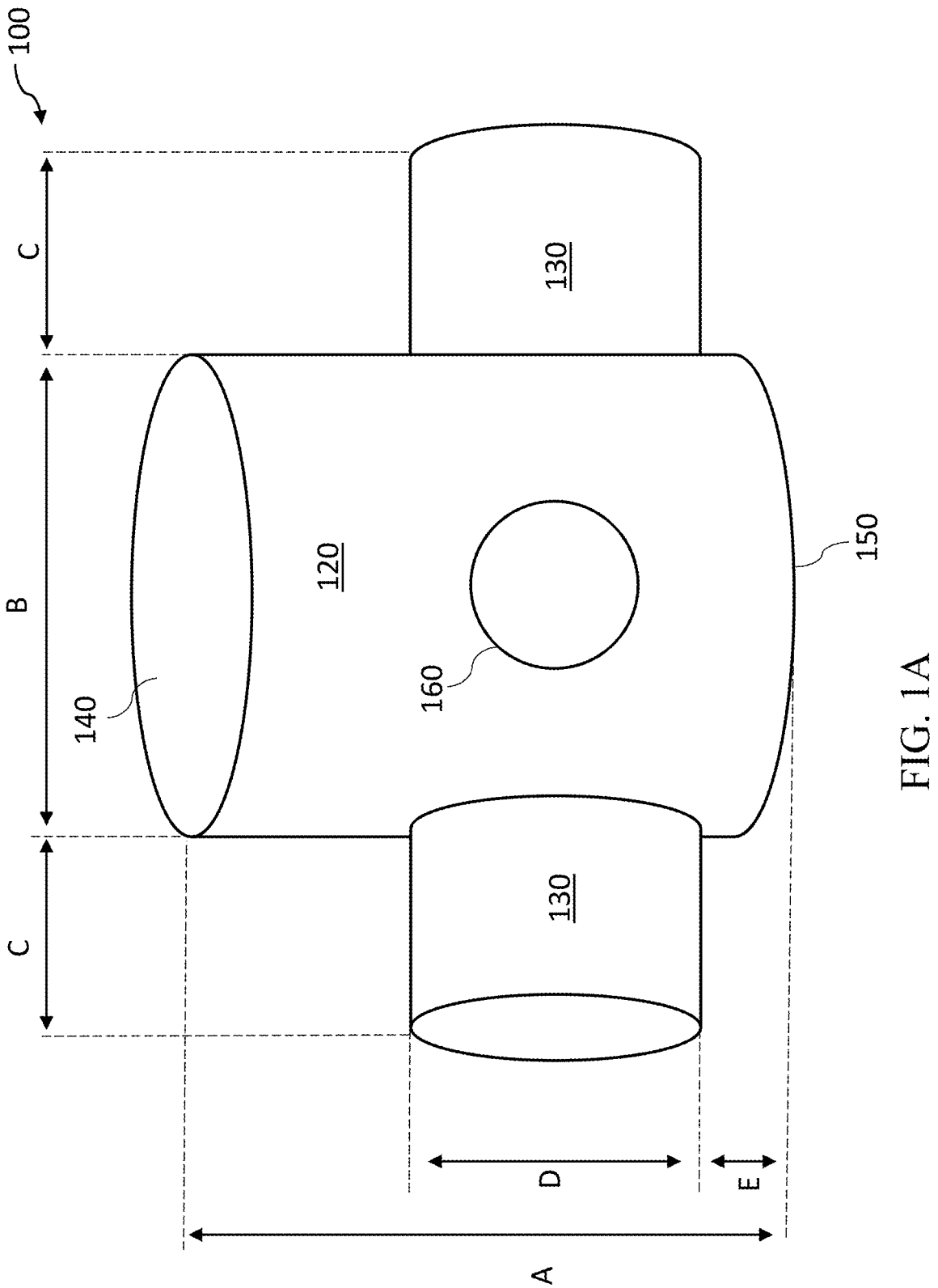
FIG. 1A is a schematic illustration a plant root management and protection system in accordance with some embodiments of the present invention.
Figure 1B:
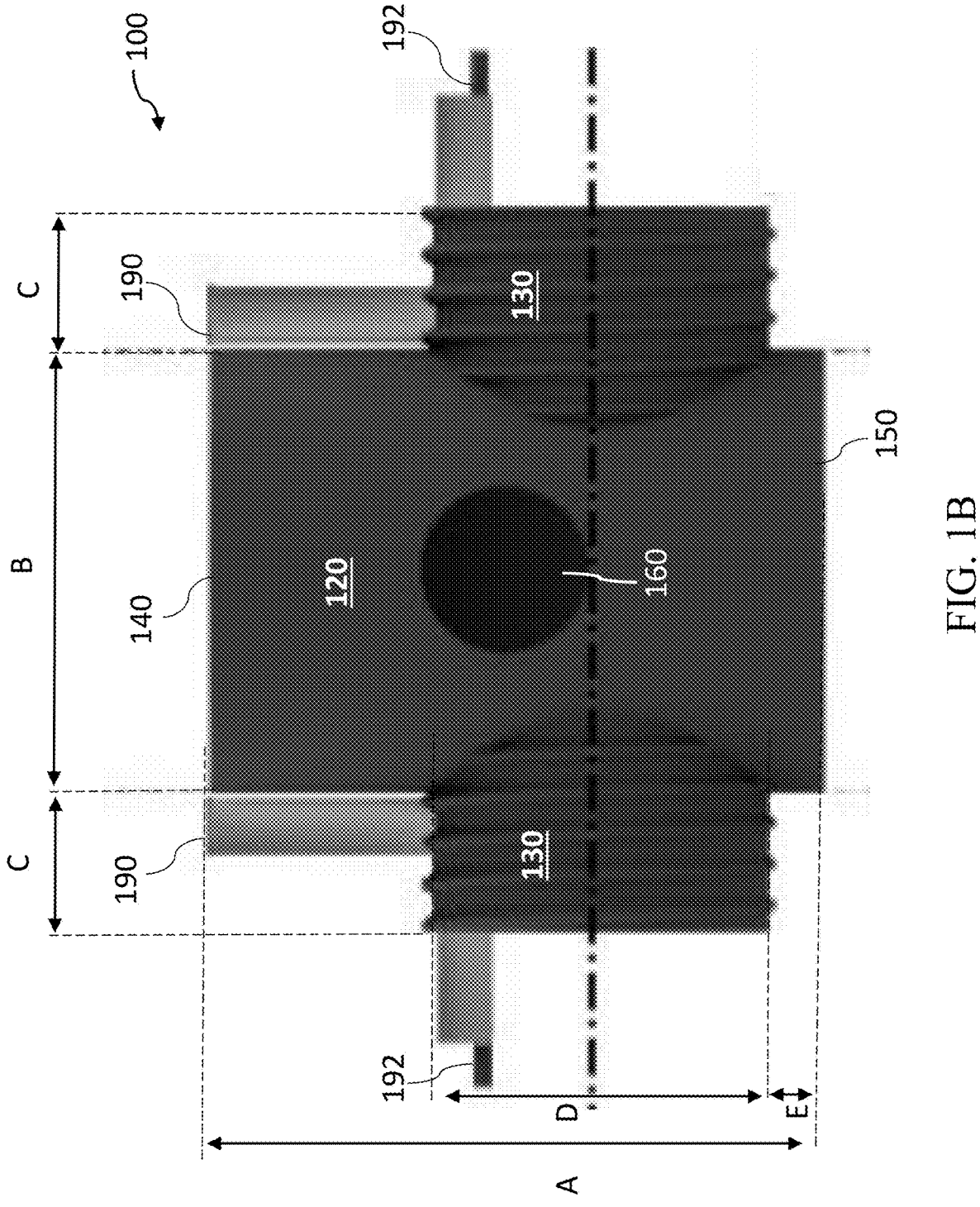
FIGS. 1B-1E are a front, top, and side view, respectively, of a plant root management and protection system in accordance with some embodiments of the present invention.
Figures 1C, 1D:
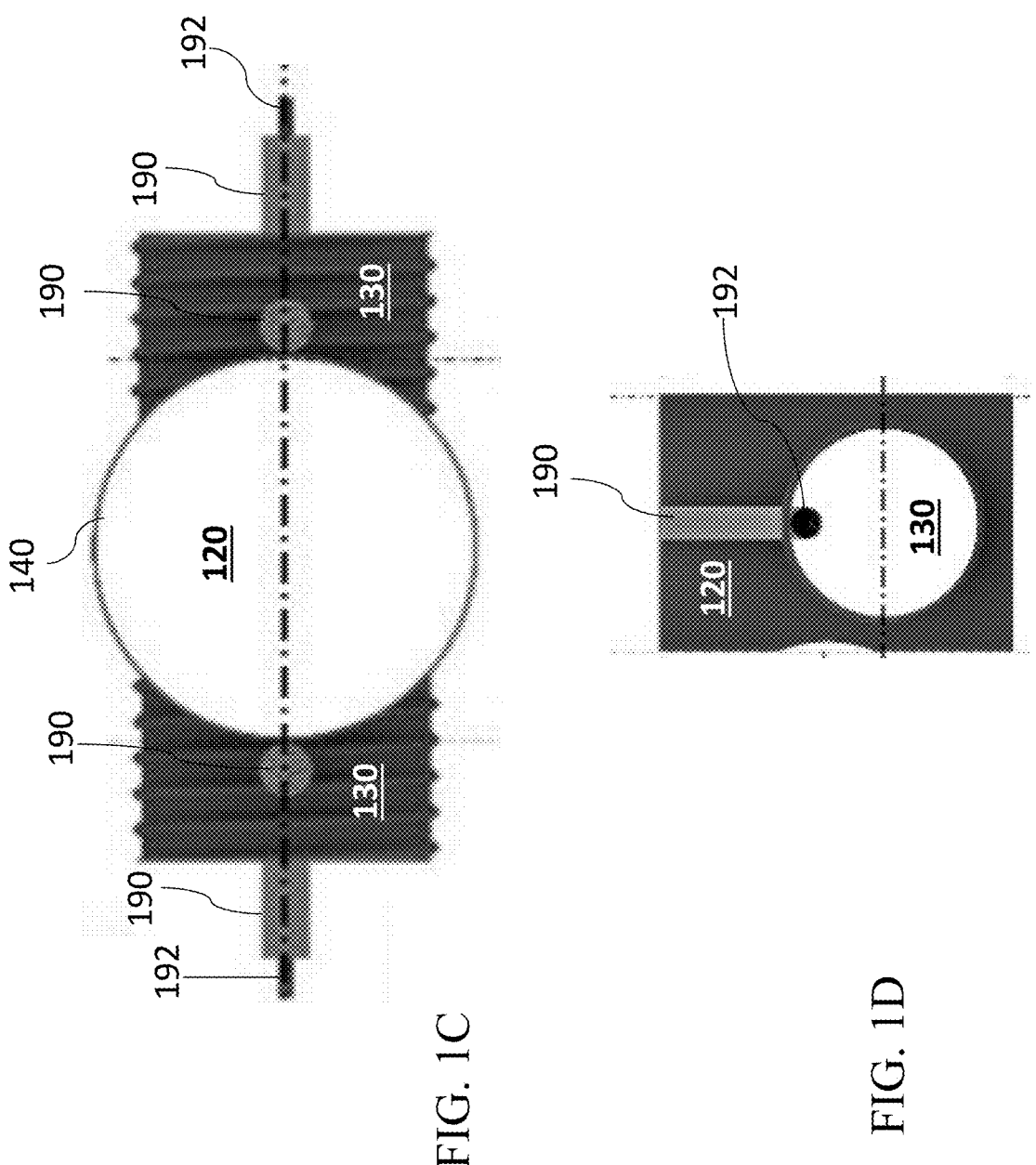

Disclosed herein are a system and method for plant root management and protection in urban and/or similar environments. In some embodiments, the present invention provides for a suitable and protected environment for trees or other large plants and vegetation in the vicinity of built-up hardscape and infrastructure such as curbs, sidewalks, pavements, and/or roadways.

In some embodiments, the present disclosure provides for a system configured for directing, managing, influencing, controlling, and/or protecting the root ball and root flare sections of plants within an urban environment. In some embodiments, the present disclosure provides a growth environment for plants in an urban environment, wherein root growth direction, management, control, and protection may be effected by providing a growth space comprising a volume or cavity defined by an upright sidewall, which may be further configured to direct, control, and/or manage root growth in one or more desired directions (e.g., downwardly and/or through dedicated root extensions in communication with the growth space), and resist and/or prevent root growth in undesired directions (e.g., upwards and laterally). In some embodiments, the present system may be configured to resist and/or prevent deformation, warping, piercing, penetrating, and/or puncturing of walls of the system by growing roots.

In some embodiments, the present system further provides for one or more openings, inlets, and/or ducts for irrigation, aeration, and/or maintenance access into portions of the system.

In some embodiments, the present system is configured to support and provide protection to the planting pit and associated and/or proximate infrastructure features. For example, in some embodiments, the present system is configured to provide structural support for, e.g., paving system adjoining the dug pit, such as edging and border pavers defining and/or supporting the pit opening. In some embodiments, the present system is configured to resist lateral and/or similar loads from adjoining paving systems, which tend to cause the pit walls and/or edge or border pavers to shift, displace, and/or collapse inwardly.

The design of many urban landscapes often calls for the planting of plants, e.g., alongside streets, pavements and walkways, so that the benefits of the trees can be enjoyed by pedestrians using these features. For example, common urban tree planting practice includes open pits which may be dug pits or cavities, typically containing compacted soil. However, trees and similar large plants rely on sending forth an extensive root system in search of nutrients and water. Compacted soil, which is often also nutrient-deficient and may be contaminated, stunts growth of the roots and consequently, prevents the development of the tree. In addition, there is a direct relationship between the size of the tree (in terms of both crown diameter and trunk diameter) and the soil volume required for healthy growth.

For example, during construction in many urban landscapes, buried rubble and debris from previous activities are often encountered. This debris, as well as any newly accumulated debris is typically left in place or buried at shallow depths. Once the infrastructure has been installed, and streets and sidewalks are paved and poured, new tree planting takes place, typically in predetermined and preserved exposed openings, e.g., tree pits, within newly poured sidewalks, or in small islands within a sea of impervious surface. The openings may be square, rectangular, or round, with dimensions of typically less than 2 square meters, or about one meter in diameter respectively, and usually contain the same compacted or otherwise unimproved soils as surrounding areas.

Paved (impervious) surfaces restrict the exchange of water, oxygen, and nutrients which normally takes place in non-impervious landscapes. These conditions are further compounded by the compaction of soil during construction activities which alters the structure of the soil particles removing air and water holding pockets within the aggregate complex. As mentioned previously, soil compaction is necessary to adequately support sidewalks and pavement, however, it interferes with the requirements of urban trees for sufficient rooting space to support healthy tree growth. Streetscapes which are often planted with street trees, are designed to withstand the compaction necessary for pavement stability for pedestrian and/or traffic loading, yet they may not provide ample rooting area vital to a tree's growth and survival, particularly if the soils are structurally poor or of limited areal dimension.

As a result, plants, and especially large plants such as tree, planted within an urban environment in a limited volume of compacted soil may fail to grow to their full potential and may even die prematurely. Urban vegetation, and in particular street trees, in areas with primarily impervious surrounding surfaces, are typically known to have higher mortality rates and lower average lifespans as compared to plants planted in the natural (less impervious) surfaces. In addition, the permanent, rigid hardscape structures surrounding the tree generally do not allow for optimal growth space for the tree. Plant, and especially tree roots are opportunistic and will seek out and grow where conditions provide adequate moisture (irrigation), nutrients, and, equally important, oxygen. Thus, a naturally distributed root system tends to be horizontal and near the soil surface (i.e., primarily in the top 2 to 4 feet of the soil profile). Horizontal root distribution requires much care and management to go into ensuring the uniform distribution of water, chemicals and nutrients so that all of a plant's root system can benefit. Even with the advent of sprinkler irrigation and chemical sprays, the horizontal root distribution pattern of woody plants requires large areas for development and, along with top growth, helps dictate plant population density. In addition, when roots extend beyond their initial planting pits, they usually seek out soil areas of lesser compaction where moisture and oxygen levels are the greatest. In the urban environment, oftentimes, the greatest concentration of moisture and oxygen can be found in the aggregate matrix layer just below the base of a sidewalk slab or paved surface. These areas may include more porous sands and gravel commonly installed directly beneath pavement, or used with subsurface infrastructure such as utility lines to provide structural support. Consequently, vegetation roots may take up primary residence in this preferential layer. This layer often contains enough voids with moisture and oxygen to allow for preferential root growth, however, it may become excessively dry during periods of drought or little rainwater penetration. In addition, without sufficient rooting area beyond and below this layer, roots, particularly the roots of trees, may cause sidewalk failure in the form of cracking and uplifting. When this occurs, the roots are usually directly below the concrete slab of the sidewalk and may be the only area where moisture and air can be consistently available at levels conducive to root growth, particularly when the underlying layers are compacted to a level which usually prevents root penetration. For example, tree roots typically occupy a relatively shallow zone in the soil but may extend outwardly well beyond the drip line of the tree. As roots of a tree grow under hard surfaces, such as brick, concrete or asphalt, they can cause the surface of the hardscape to crack and lift, resulting in unsightly and potentially unsafe damage to the hardscape. This root heave is mostly triggered by tree roots that do not have sufficient growing space underground, caused largely by the compacted soil.

Thus, in some cases, inadequate growing conditions may result in damage to the surrounding hardscape. Additionally, extensive root growth may also interfere with utility lines running below the surface of the hardscape. Further additionally, trees may cause soil shifting and movement affecting the overlying hardscape which may result in buckling of the hardscape.

Known solutions have several relative disadvantages. Shallow root management solutions, which may provide a relatively shallow apron or collar which surrounds the root ball and/or root flare of a tree, are typically insufficient to prevent root heave and/or limit root growth to a defined underground space and direction. Other solutions may require excavating a relatively deep trench to accommodate a system which will provide for adequate growth volume for a tree. These excavation requirements present significant labor costs, and are not always feasible in an urban environment where utility infrastructure may be co-present in the same location. Open cell plastic modular chambers that lessen the effects of severe compaction have a lattice structure which provides load bearing capabilities and support for soils, thereby resisting the occurrence of compaction. However, these systems present a significant cost in both materials and labor in installation, particularly if new soils are necessary in the reconstruction process. Other solutions provide for structural elements which support a pavements system surrounding tree pits. However, these structural elements are sizeable and bulky, which reduces the effective tree growth volume, and are generally intended to be set in place at the time of pavement construction and the pouring of concrete, and thus do not offer flexibility in design and installation.

Accordingly, in some embodiments, the present disclosure provides for a plant root management and protection system configured for planting plants therein and for deployment below a surface level in an urban environment, e.g., within an excavated pit, ditch, trench and/or any other similar ground cavity configured for the receiving and growing of plants therein. In some embodiments, the present disclosure provides for a system which may be deployable within a standard-sized pit in use by municipalities around the world, e.g., comprising an opening having an area of approx. 2 square meters or less. In some embodiments, the present system provides a lining with respect to a dug pit.

Thus, in some embodiments, a plant root management and protection system of the present disclosure provides an environment which protects the root flare and root ball sections of plants, directs and controls the growth of roots, and provides a suitable growth space and/or volume within the confines of a standard municipal pit, while minimizing excavation depth and/or volume requirements.

In some embodiments, the present system is self-supporting and may be deployed and integrated into an existing cityscape by excavating a cavity and/or trench of a specified volume and depth, without requiring any additional construction and/or structural requirements, such as any pouring of concrete for support.

In some embodiments, the present system provides a structurally rigid growth space, which is deployed in-ground, below a surface level of the hardscape, e.g., in a dug pit, and is capable of managing, directing, controlling and limiting the growth of roots to within a defined volumetric space within the system, and/or in defined directions externally to the system.

In some embodiments, the present system may be constructed from any rigid, semi-rigid, and/or flexible material and/or combination of materials capable of directing, controlling, influencing, and/or protecting plant roots. In some embodiments, one or more walls of the present system may be substantially impervious to water and nutrients for root growth, such that the root growth of the plant is maintained within the intended space.

In some embodiments, the present disclosure provides for a system configured to direct, control, and/or manage root growth in one or more desired directions (e.g., downwardly and/or through dedicated root extensions in communication with the growth space), and resist and/or prevent root growth is undesired directions (e.g., upwards and laterally). In some embodiments, the present system may be configured to resist and/or prevent deformation, warping, piercing, penetrating, and/or puncturing of walls of the system by growing roots.

In some embodiments, the present system is structurally configured to be anchored within a bottom surface of a dug pit or similar cavity, so as to further resist rotational and/or axial displacement of system 100 and any plant therein, e.g., about a horizontal axis which may result in tilting of the plant. In some embodiments, the anchoring provides stability to the plant and eliminates a risk of displacement, tilting and/or collapsing of a plant planted therein.

In some embodiments, the present system comprises a plurality of openings and/or perforations configured for facilitating planting, root growth management, aeration, drainage, and/or access for maintenance.

In some embodiments, the present system may be made of any suitable material, such as a polymer (e.g., polyethylene, polypropylene, and/or any other type of polyolefins), metal (cast iron, black iron, clay, clay compound steel, etc.), concrete, and/or any combination thereof. In some embodiments, the present system may be made from any suitable material or a combination of materials configured for directing and managing root growth while resisting and/or preventing deformation, warping, piercing, penetrating and/or puncturing of walls of the system by growing roots.

In some embodiments, some or all portions of the present system may partially or wholly be shaped to define a corrugated or similarly ribbed or ridged configuration, which may provide additional anchoring into the ground surrounding the present system. In other variations, the material itself, e.g., concrete, may provide the necessary structural strength and rigidity to each section.

A potential advantage of embodiments of present invention is, therefore, in that it provides a solution for growing trees and/or other relatively large plants in the vicinity of built-up hardscape, while providing for plant root management and direction and adequate growing space with suitable soil conditions, while minimizing construction and/or excavating the pit digging space required for planting. Additionally, embodiments of the present invention provide for, ready access for maintenance, and effective water drainage. An additional potential advantage of the present invention is, in that it provides stabilizing the planted plant in a manner that inhibits collapsing and shifting of the plant under gravitational forces and/or harsh weather conditions, e.g., to high winds which may sway a plant or tree.

Reference is now made to FIG. 1A, which is a projection illustration of a plant root management and protection system 100, in accordance with some embodiments of the present invention.

FIGS. 1B-1E are a front, top, and side view, respectively, of system 100 in accordance with some embodiments of the present invention.

In some embodiments, system 100 comprises an upright, vertically oriented, system for facilitating plant root growth in-ground, below ground, e.g., a surface level of proximate hardscape. In particular, system 100 is configured for being embedded and/or lining a dig put, and for providing anchoring and structural support to the plant in the upright dimension, so as to prevent rotational and/or axial displacement and/or collapsing and/or toppling and/or tilting of a planted plant therein about a horizontal axis. In some embodiments, system 100 may be configured to be embedded in a dug pit or a trench, so as to be substantially flush with an opening of the pit and/or not extend above a level of an opening of the pit.

In some embodiments, system 100 may be configured to support at least some hardscape surrounding the plant, e.g., edging and border pavers, to prevent collapsing and/or otherwise shifting of the surrounding hardscape features. In some embodiments, the present system is configured to resist loads from adjoining paving systems in the lateral dimension, which tend to cause the pit walls and/or edge or border pavers to shift, displace, and/or collapse inwardly.

In some embodiments, system 100 provides optimal and/or maximal growth space within a standardized municipal pit, while minimizing digging requirements in the depth dimension.

In some embodiments, system 100 comprises a sidewall 120 having an overall length A of, e.g., between 60-200 cm (e.g., 110 cm), and a diameter B of between 60 cm and 250 cm (e.g., 80 cm). In some embodiments, sidewall 120 may comprise a sidewall peripherally defining an internal hollow volume or cavity and having top and bottom openings. In some embodiments, sidewall 120 may be a cylindrical tube or pipe having openings at both ends. In some embodiments, other types of elongated hollow bodies of varying shapes may be used, having, e.g., oval, octagonal, rectangular, or other cross-sectional profiles. In some embodiments, sidewall 120 is dimensioned to be embedded in and/or line a standardized municipal and/or urban tree or plant pit having dimensions comprising, e.g., a depth of no more than 110 cm, and an opening of no more than 130 cm in width and/or diameter. In some embodiments, pit dimensions may be between 60-200 cm in depth and between 60-250 cm in diameter.

Sidewall 120 is shaped to define a top or proximal end 140 and a bottom or distal end 150 and a longitudinal axis extending along the length of sidewall 120 between the top or proximal and distal ends. Sidewall 120 has a top or proximal opening at proximal end 140, shaped and sized to receive at least a portion of a tree/plant therethrough, e.g., a root ball of plant or a tree. Typically, the top or proximal opening has the same cross-sectional area/diameter of sidewall 120. In some embodiments, bottom or distal opening 150 may be defined by a peripheral edge of sidewall 120.

Sidewall 120 is further shaped to define a bottom or distal opening at bottom or distal end 150. In some embodiments, the bottom or distal opening has the same cross-sectional area/diameter of sidewall 120, and of the top or proximal opening. In some embodiments, the bottom or distal opening at the bottom of sidewall 120 may be configured for providing water drainage for system 100. In some embodiments, the bottom or distal opening permits water egress from system 100. It is noted that system 100 may comprise more than one drainage openings, potentially of varying shapes and sizes and diameters.

In this context, in the specification and in the claims, "proximal" means closer to the surface of the hardscape into which the plant is planted, and "distal" means further from this surface (i.e., deeper in the ground).

Sidewall 120 is hollow to provide for growth space for the plant roots and is typically filled with soil suitable for healthy plant growth, e.g., a rooting or growing medium. The hollow passageway of sidewall 120 typically extends from the top or proximal opening to the bottom or distal opening.

For some embodiments, plant root management and protection system 100 comprises at least one, e.g., two, root-guiding extensions 130 extending radially and substantially perpendicularly from sidewall 120. Typically, each one of root-guiding extensions 130 defines a hollow passageway in communication with the hollow passageway of the sidewall. Together with sidewall 120, root-guiding extensions 130 provide a growth space for the plant planted in system 100. System 100 is structurally configured to allow growth of the plant roots in the volume defined by sidewall 120 and root-guiding extensions 130. Additionally, system 100 is structurally configured to allow growth of the plant roots therein while providing anchoring of the plant to inhibit rotational and/or axial displacement and collapsing of the plant.

In some embodiments, sidewall 120 and/or root-guiding extensions 130 are configured for managing, limiting, directing, and/or controlling the growth of roots within system 100, to minimize potential damage to the surrounding hardscape due to, e.g., buckling and root heave. Thus, roots growing within system 100 may be confined to the internal space of sidewall 120, and/or directed downwardly and/or to the openings communicating between sidewall 120 and root-guiding extensions 130. Root-guiding extensions 130 are typically positioned so as to control and direct root growth, e.g., substantially horizontally, Additionally, root-guiding extensions 130 provide outlets for the roots of plant planted in system 100.

For some embodiments, each one of root-guiding extensions 130 has a length of 20-100 cm, e.g., 60 cm, measured along a longitudinal axis of the root-guiding extension. For some embodiments, root-guiding extensions 130 have a diameter and/or height D of, e.g., 60 cm, or between 30-80 cm, or between 70-90% of the length of sidewall 120. In some embodiments, each of root-guiding extensions 130 extends a length C between 15-40 cm, e.g., 25 cm from a plane of sidewall 120.

Figure 1E:
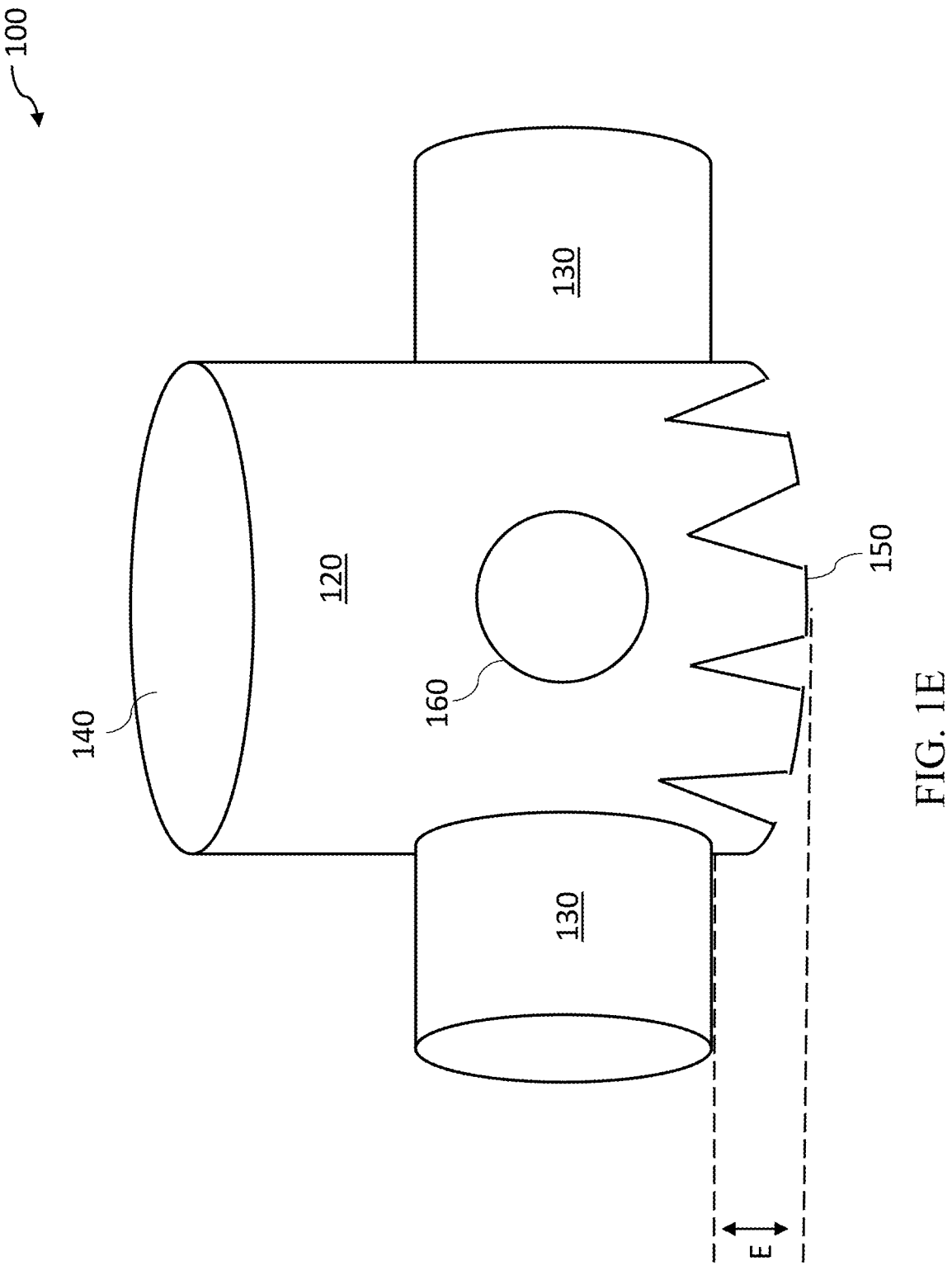

For some embodiments, root-guiding extensions 130 extend from sidewall 120 at a location such that a bottom portion thereof is located at a specified distance E from bottom or distal end 150, e.g., 10 cm, or between 7-15 cm. Accordingly, when system 100 is deployed within a pit or a trench, a portion E of sidewall 120 extends below a bottom-most part of root-guiding extensions 130 into a ground below. Portion E ends in a peripheral edge defining bottom or distal opening 150, and is used to anchor system 100 in the ground and inhibit rotational movement and collapsing of the plant in system 100, as will be further described below. In some embodiments, as can be seen in FIG. 1E, portion E may be fashioned in a plurality of profiles to facilitate entrenching of portion E, e.g., a saw-toothed profile, a scalloped profile, a zigzag profile, and the like.

In some embodiments, sidewall 120 may be shaped to define one or more openings 160. These openings typically provide outlets for the roots of plant planted in system 100, as will be further described with reference to FIG. 2.

In the embodiment shown in FIG. 1A, system 100 comprises at least one portion, e.g., root-guiding extensions 130, that has a corrugated-type pipe construction having an inner wall defining a cylindrical hollow passageway, and a corrugated outer wall having successive spaced-apart annular ribs and valleys. In some embodiments, each of the annular ribs defines a corresponding annular hollow channel formed interiorly thereof. In some embodiments, the ribs may be formed, e.g., annularly and/or helically around root-guiding extensions 130. Typically, these ribs increase the structural rigidity and strength of system 100. Alternatively, or additionally, any other portion of system 100 has a corrugated-type pipe construction defining ribs and valleys, for example, portion of sidewall 120.

The structural form of system 100 shown in FIG. 1A, is an exemplary embodiment only, and in some variations, system 100 may comprise different structural designs, such as a corrugated and/or non-corrugated single-layer construction; different and/or additional strengthening structural elements, such as ribbing, ridging, and/or similar features; and/or different materials used for constructing various portions of system 100.

In some embodiments, system 100 comprises at least one or more maintenance inlet or duct to provide for watering, aeration, and/or maintenance access into portions of system 100. In some embodiments, one or more maintenance ducts 190 shaped to define a maintenance opening for providing access into system 100. In some embodiments, maintenance duct 190 provides for at least one of fluid, liquid, and/or air exchange and communication between an above-ground ambient environment and one or more locations within an internal volume of system 100, e.g., sidewall 120 and/or root-guiding extensions 130. In some embodiments, atmospheric air may be introduced into one or more locations within system 100 through one or more ducts 190.

In some embodiments, one or more ducts 190 extend, e.g., a length of sidewall 120 and/or a length of one or more root-guiding extensions 130. In some embodiments, one or more ducts 190 comprise, e.g., a plurality of perforations along its lengths and/or about its circumference.

In some embodiments, maintenance duct 190 and its opening may be of various shapes, such as circular, oval, rectangular, or another shape. In some embodiments, duct 190 comprises a relatively small diameter duct located, e.g., vertically, within or eternally to sidewall 120, and having a proximal opening configured to reach at least to ground level and provide surface-level access into system 100 for, e.g., maintenance watering, fertilization, nourishing, and/or aeration of the growing medium inside system 100.

In some embodiments, an irrigation conduit 192 is disposed internally within duct 190. The irrigation conduit is typically configured to provide a conduit for an irrigation element, such as a drip irrigation element. In some embodiments, irrigation conduit 192 may advantageously comprise a layer of geotextile fabric disposed along its length, so as to prevent clogging of the irrigation element. In some embodiments, irrigation conduit 192 is configured for placing in an upper internal area of sidewall 120 and/or root openings 130, so as to irrigate soil within the system from above.

Additionally, or alternatively, in some embodiments, duct 190 is configured for providing aeration of the interior of portions of system 100, e.g., of sidewall 120. For such embodiments, duct 190 is part of an aeration system for introducing atmospheric air into the interior of system 100. In some embodiments air is introduced through the opening. In some embodiments, aeration shafts may be configured for extending to at least surface level, to provide air exchange and communication between the ambient atmosphere and system 100, e.g., sidewall 120 and/or root-guiding extensions 130.

Figure 2:
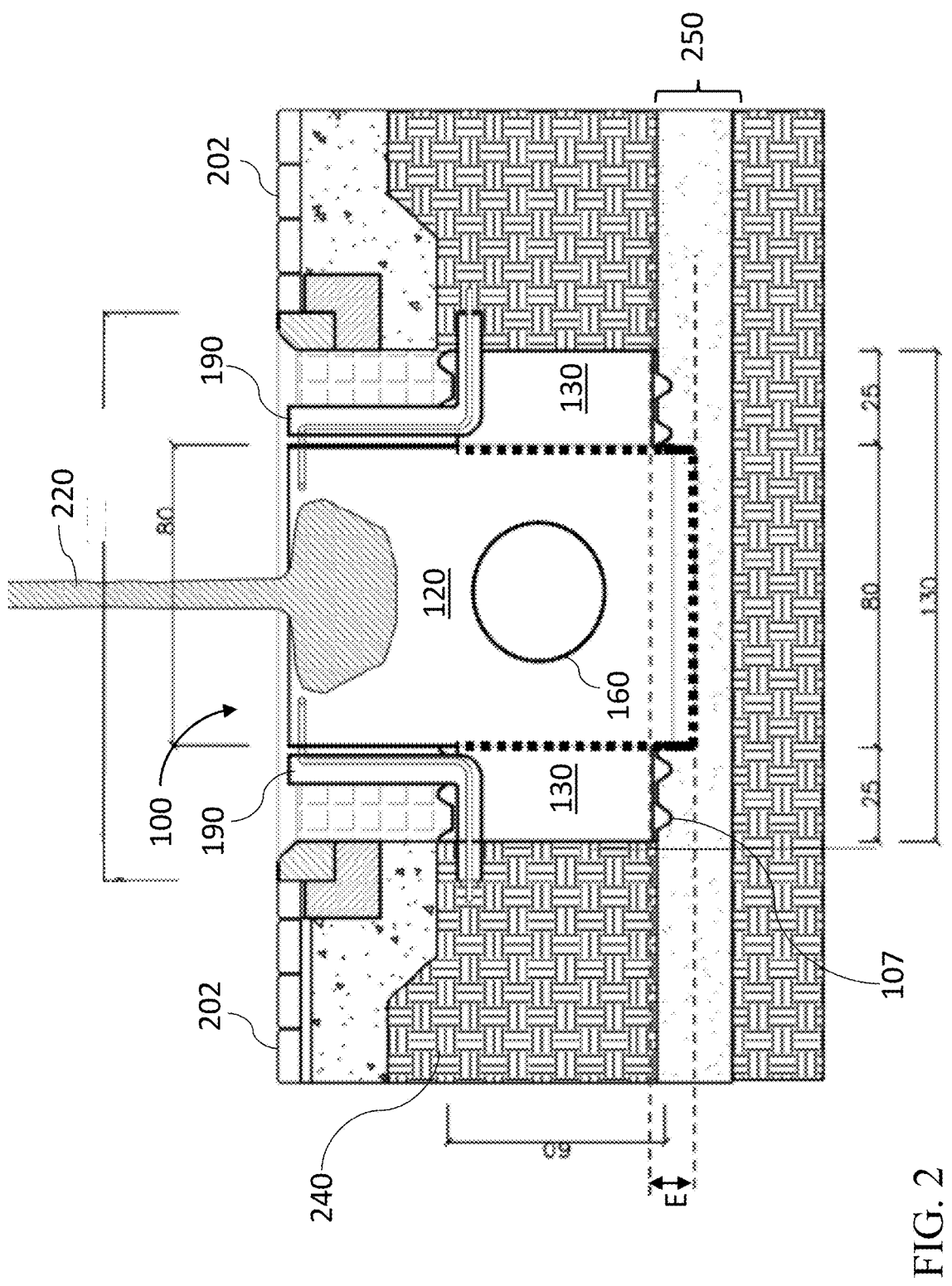
FIG. 2 is a schematic cross-sectional front view of the system deployed in an urban hardscape, in accordance with some embodiments of the present invention.

Reference is now made to FIG. 2, which is a schematic cross-sectional front view of system 100 deployed in an urban scape, according to some embodiments of the present invention. As shown, system 100 may be positioned in-ground, below a surface level of the hardscape, e.g., within a trench dug below a surface level of curb/pavement 202. System 100 is deployed in the hardscape such that the top or proximal opening generally does not extend above a level of the surface of the hardscape (pavement 202), and a longitudinal axis of sidewall 120 is upright or perpendicular with respect to grade level.

Sidewall 120 and root-guiding extensions 130 are typically configured for providing sufficient root outlets and additional growth volumes for supporting the growing of one or more plants 220, which are planted through a top opening 140 of sidewall 120. The opening may be dimensioned for receiving, e.g., a root ball of a tree or another large plant therethrough. In some embodiments, the top opening 140 may have a shape other than circular, e.g., e.g., oval, octagonal, rectangular, or another cross-sectional profiles. In some embodiments, an area of the top opening 140 may be approx. 2 square meters.

Figure 3:
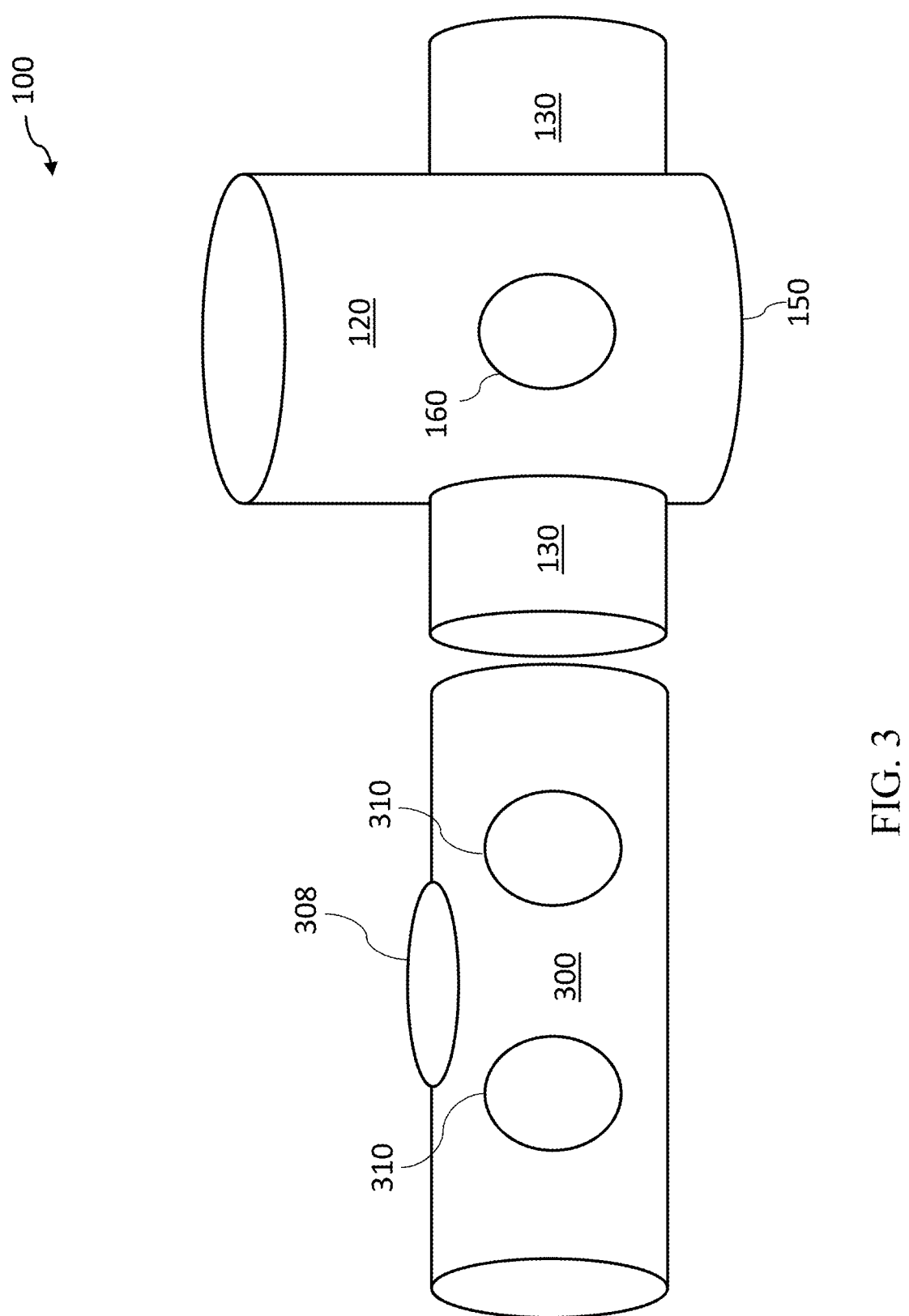
FIG. 3 shows a planting extension, in accordance with some embodiments of the present invention.

As illustrated in FIG. 3, in some embodiments, system 100 may be a part of a larger continuous plant root management and protection system comprising a plurality of sections as such system 100. Another configuration may comprise an extension section, configured for interconnecting to system 100 and serving, e.g., to extend an internal growth space and/or provide for maintenance access to the system.

In some embodiments, one or more extension portions, e.g., section 300 in FIG. 3, may comprise a planting extension configured to extend, e.g., from root-guiding extension 130.

In some embodiments, section 300 may be used as part of a larger modular plant growth system. Section 300 may be a tubular extension having a length of between, e.g., 100 cm and 800 cm and an inner diameter of between 30-80 cm. In some embodiments, other types of pipes and/or similar elongated hollow bodies of varying shapes may be used, having, e.g., oval, octagonal, rectangular, or other cross-sectional profiles. In the embodiment shown in FIGS. 3, section 300 comprises a tube having an inner wall defining a cylindrical hollow passageway. The structural form of section 300 may comprise different structural designs, such as a corrugated and/or non-corrugated single-layer construction; different and/or additional strengthening structural elements, such as ribbing, ridging, and/or similar features; and/or different materials used for constructing various portions of section 300.

Section 300 may comprise one or more through openings located about a longitudinal upper half of section 300, such as openings 308. For example, in some embodiments, an opening 308 may be located centrally relative to the longitudinal and/or transverse dimensions of section 300. In other embodiments, opening 308 may be moved along the longitudinal dimension of section 300, and/or be offset to one side relative to a longitudinal center line of section 300.

In some embodiments, opening 308 may be of various perimeter shapes, such as circular, oval, rectangular, or another shape. In some variations, section 300 may comprise more than one opening 308, potentially of varying shapes and sizes, depending, e.g., on an overall length of section 300.

In some embodiments, opening 308 may be dimensioned for receiving, e.g., a root ball of a tree or another large plant therethrough. In some embodiments, each opening 308 has a diameter of between 20 and 160 cm. In some embodiments, a total opening area of each opening 308 may be between, e.g., approximately 300 and 20000 cm$^2$.

In some embodiments, section 300 may further comprise at least two through root openings 310. In some embodiments, root openings 310 may be of various perimeter shapes, such as circular, oval, rectangular, or another shape. In the circular version, root openings 310 may each have a diameter of between 5 and 30 cm. In some embodiments, a diameter of openings 310 may be proportional to a diameter of extension 300, e.g., each opening 310 may have a diameter of between 15-30% of a diameter of extension 300. In other variations, root openings 310 may each have a total opening area of between approximately 20 and 700 cm$^2$.

In some embodiments, root openings 310 may be configured for providing an outlet for roots of a tree or plant growing within section 300, so as to direct the roots towards a desired growth path that would not interfere with the surrounding hardscape. For example, root openings 310 may be located so as to direct the roots of tree 220 to one side only, i.e., away from a roadway and towards the area underneath a curb. In other embodiments, root openings 310 may be configured for directing the roots in either or both sides, and in various angles relative to a horizontal plane.

In some variations, section 300 may comprise more than two root openings 310, potentially of varying shapes and sizes, depending, e.g., on an overall length of section 300 and its intended function within system 200. For example, section 300 may comprise between 3 and 10 root openings 310, arranged in a variety of layouts, e.g., in pairs along longitudinal rows. In some embodiments, the root openings 310 may be spaced between 40 cm and 120 cm center-to-center. In other variations, section 300 may be configured such that root openings 310 located in an upper row of openings may have an opening area smaller than that of root opening 310 located in a lower row.

As discussed hereinabove, sidewall 120 and root-guiding extensions 130 provide a growth space volume for healthy growth of plant 220. In some embodiments, a growth space volume provided by apparats 100 is between 0.5-10 cubic meters.

As shown in FIG. 2, system 100 is deployed in ground, below hardscape level (e.g., curb/pavement 200), typically within a dug pit or trench. In accordance with some embodiments of the present invention, system 100 is configured for deployment in a dug pit in the ground having a maximal depth of 200 cm. In some embodiments, a maximal width of the pit or trench is 250 cm. Typically, the width ranges between 100-150 cm. In some embodiments, a plant growth space I maximized while depth of the pit is minimized without compromising the growth space for the plant.

Additionally, or alternatively, as described hereinabove, a bottom portion E of sidewall 120 may function as an anchor for anchoring system 100 within the ground and/or surrounding hardscape. It is noted that in some embodiments, anchoring portion E may be separate compartment coupled to sidewall 120 and in communication with sidewall 120 to provide a root outlet and drainage in system 100.

As shown in FIG. 2, sidewall 120 extends distally beyond a lowest bottom portion of root-guiding extensions 130 to form anchoring portion E. Typically, sidewall 120, extends 10 cm, or between 7-25 cm distally within portion E.

As shown in FIG. 2, when deployed within the dug pit in the ground, anchoring portion E may comprise a rim, edge, or perimeter of sidewall 120 defining bottom opening 150. As such, anchoring portion E may be embedded at the bottom of the pit, e.g., by entrenching it within bottom layer 250 of the pit. In some embodiments, bottom layer 250 may comprise, e.g., a sand or gravel layer. In some embodiments, layer 250 may comprise any type of suitable medium. For example, layer 250 may be the same soil as soil 240 (e.g., compacted soil 240) or a different type of medium, (e.g., gravel as illustrated in FIG. 2). Typically, the pit into which anchoring portion E is inserted has a diameter which is generally the same as the diameter of anchoring portion E (e.g., 80-100 cm) to ensure a tight fit of soil around portion E. As shown in FIG. 2, when anchoring portion E is disposed in the sand/gravel layer 250, bottom sides 103 of root-guiding portions 130 are disposed on top of layer 250 thereby creating an anchor for system 100 and physically resisting rotational and/or tilting and/or axial displacement. Securing system 100 in such a manner typically prevents collapsing, tilting, and general displacement of plant 220.

In some embodiments, ribs 107 additionally contribute to the stability of system 100 by extending into the surrounding ground so as to resist rotational and/or axial displacement of system 100.

Reference is still made to FIG. 2. In accordance with some embodiments of the present invention, system 100 is shaped to define additional one or more root outlet openings such as opening 160. In some embodiments, each root opening 160 may be of various perimeter and shape, such as circular, oval, rectangular, or another shape. In the circular configuration, as shown in FIG. 2, each root opening 160 may have a diameter of between 5 and 180 cm. In some embodiments, a diameter of openings 160 may be proportional to a diameter of sidewall 120, e.g., opening 160 may have a diameter of between 15-30% of a diameter of sidewall 120.

In other optional configurations, root opening 160 may each have a total opening area of between approximately 20 and 700 cm$^2$. As shown by way of illustration in FIG. 2, root openings 160 may be disposed at any location along longitudinal axis.

In some embodiments, the one or more root opening 160 may be configured for providing an outlet for roots of a tree or plant growing within system 100, so as to direct the roots towards a desired growth path that would not interfere with the surrounding hardscape. For example, root opening 160 be located so as to direct the roots of plant 220 to one side only, i.e., to an area away from, and underneath, pavement 202. In other embodiments, root opening 160 may be configured for directing the roots in either or both sides, and in various angles relative to a horizontal plane.

In some embodiments, system 100 may comprise any number of root openings 160, potentially of varying shapes and sizes, depending, e.g., on an overall length of sidewall 13
14

120. For example, system 100 may comprise between 3 and 10 root openings 160, arranged in a variety of layouts, patterns and spacings in sidewall 120.

It will be appreciated that all the above description and examples have been given for the purpose of illustration and are not intended to limit the invention in any way. The terms, "for example," "e.g.," "optionally," as used herein, are intended to be used to introduce non-limiting examples. While certain references are made to certain example components, other components can be used as well and/or the example components can be combined into fewer components and/or divided into further components. In the description and claims of the application, each of the words "comprise" "include" and "have," and forms thereof, are not necessarily limited to members in a list with which the words may be associated. In addition, where there are inconsistencies between this application and any document incorporated by reference, it is hereby intended that the present application controls.

What is claimed is:

1. A plant root management and protection system configured for embedding within a dug pit, the system comprising:
   a sidewall peripherally defining a receiving internal cavity and having (i) a top opening dimensioned to receive a root ball of a plant therethrough, and (ii) a bottom opening defined by a peripheral edge of said sidewall, wherein the sidewall extends vertically from the bottom opening to the top opening; and
   at least one root-guiding extension extending outwardly from said sidewall and perpendicularly to a longitudinal axis of said sidewall, wherein each of said at least one root-guiding extensions defines an open-ended hollow passageway in communication with said cavity;
   wherein, when embedded a dug pit, said longitudinal axis of said sidewall is upright and said top opening does not extend above surface level, and
   wherein at least a vertical portion of said sidewall comprises a vertical anchoring portion extending below a bottom-most part of said root-guiding extensions into a ground below, said anchoring portion ends in said peripheral edge,
   wherein said anchoring portion is configured to be anchored within a bottom surface of said dug pit, and wherein said system is structurally configured to resist at least rotational displacement of said system.

2. The system according to claim 1, wherein, when embedded within said dug pit, said vertical anchoring portion is configured to inhibit collapsing of a plant in the system.

3. The system of claim 1, wherein said sidewall is configured to resist lateral loads from one or more paving systems adjoining said dug pit.

4. The system of claim 1, wherein said sidewall is configured to resist penetration by roots of said root ball.

5. The system of claim 1, wherein said peripheral edge has a profile selected from the group consisting of: a saw-tooth profile, a scalloped profile, and a zigzag profile.

6. The system of claim 1, wherein said sidewall has a length of between 60-200 cm, and wherein said vertical portion of said peripheral edge has a length of between 10-30% of said length of said sidewall.

7. The system of claim 1, wherein the sidewall has a cross-sectional profile selected from the group consisting of: a circle, an oval, an octagon, and a rectangle.

8. The system of claim 1, wherein said system is made of at least one of: a rigid material, a semi-rigid material, and a flexible material.

9. The system of claim 1, wherein said system is made of one or more materials selected from the group consisting of: a polymer, a polyolefin, cast iron, black iron, steel, clay, clay compounds, and concrete.

10. The system of claim 1, wherein said system is made of one or more materials which are substantially impervious to water and nutrients intended for root growth.

11. The system of claim 1, comprising a duct configured to provide air exchange between one or more locations within said internal cavity and the ambient atmosphere.

12. The system of claim 11, wherein said duct is located within side sidewall.

13. The system of claim 11, wherein said duct is further configured to provide air exchange between one or more locations within said at least one root-guiding extension and the ambient atmosphere.

14. The system of claim 11, wherein said duct comprises a plurality of perforations along its length.

15. The system of claim 11, wherein said duct comprises an irrigation element.

16. The system of claim 15, wherein said irrigation element is a drip irrigation element.

17. The plant root management and protection system of claim 1,
   wherein said anchoring portion extends between 7-25 cm distally below the bottom-most part of said root-guiding extensions.

18. A method for plant root management and protection within a dug pit, the method comprising:
   providing a system comprising:
      a sidewall peripherally defining a receiving internal cavity and having (i) a top opening dimensioned to receive a root ball of a plant therethrough, and (ii) a bottom opening defined by a peripheral edge of said sidewall, wherein the sidewall extends vertically from the bottom opening to the top opening; and
      at least one root-guiding extension extending outwardly from said sidewall and perpendicularly to a longitudinal axis of said sidewall, wherein each of said at least one root-guiding extensions defines an open-ended hollow passageway in communication with said cavity,
      wherein, when embedded a dug pit, said longitudinal axis of said sidewall is upright and said top opening does not extend above surface level, and
      wherein at least a vertical portion of said sidewall comprises an anchoring portion extending below a bottom-most part of said root-guiding extensions into a ground below, said anchoring portion ends in said peripheral edge;
   embedding said system within said dug pit such that said longitudinal axis of said sidewall is upright and said top opening does not extend above said hardscape;
   entrenching said vertical portion in said bottom surface;
   at least partially filling said system with a rooting medium; and
   planting a tree through said top opening.

19. The method according to claim 18, wherein, when embedded within said dug pit, each of said at least one root-guiding extensions is configured for sitting on top of said bottom surface.

20. The method of claim 18, wherein said sidewall is configured to resist lateral loads from one or more paving systems adjoining said dug pit.

\* \* \* \* \*